(12) United States Patent
Semper

(10) Patent No.: US 8,098,597 B2
(45) Date of Patent: Jan. 17, 2012

(54) IAS-BASED CONFIGURATION FOR UMB FEMTO DEVICES

(75) Inventor: William Joseph Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1000 days.

(21) Appl. No.: 12/071,581

(22) Filed: Feb. 22, 2008

(65) Prior Publication Data
US 2009/0052418 A1    Feb. 26, 2009

Related U.S. Application Data

(60) Provisional application No. 60/935,679, filed on Aug. 24, 2007.

(51) Int. Cl.
*H04L 12/28* (2006.01)
*H04W 4/00* (2009.01)
*H04W 36/00* (2009.01)

(52) U.S. Cl. .................. 370/255; 370/331; 455/444
(58) Field of Classification Search ............ 370/331
See application file for complete search history.

(56) References Cited

U.S. PATENT DOCUMENTS

| | | | |
|---|---|---|---|
| 2008/0247360 A1* | 10/2008 | Tinnakornsrisuphap et al. | 370/331 |
| 2008/0261598 A1* | 10/2008 | Tinnakornsrisuphap et al. | 455/436 |
| 2008/0263631 A1* | 10/2008 | Wang et al. | 726/2 |
| 2008/0298595 A1* | 12/2008 | Narayanan et al. | 380/278 |
| 2008/0310323 A1* | 12/2008 | Shirota et al. | 370/254 |
| 2008/0310349 A1* | 12/2008 | Ulupinar et al. | 370/328 |
| 2008/0311914 A1* | 12/2008 | Tinnakornsrisuphap et al. | 455/436 |
| 2008/0318575 A1* | 12/2008 | Ulupinar et al. | 455/436 |
| 2009/0046767 A1* | 2/2009 | Tinnakornsrisuphap et al. | 375/211 |

OTHER PUBLICATIONS

"Overview for Ultra Mobile Broadband (UMB) Air Interface Specification", 3RD Generation Partnership Project 2 "3GPP2", 3GPP2 C.S0084-000-0, Version 2.0, Aug. 2007.
"Interoperability Specification (IOS) for Ultra Mobile Broadband (UMB) Radio Access Network Interfaces", 3RD Generation Partnership Project 2 "3GPP2", 3GPP2 A.S0020-0v1.0, Nov. 2007.

* cited by examiner

*Primary Examiner* — Andrew Chriss

(57) ABSTRACT

A method and apparatus configure Femto Devices in an Ultra Mobile Broadband network system. A Femto Device transmits a Femto pilot signal to an Access Terminal, which is served by a plurality of base stations in the Ultra Mobile Broadband network system. The Access Terminal then transmits to the Femto Device an identifier of a base station that controls a macro cell where the Femto Device is located. Next, a Neighbor Discovery Request message is transmitted from the Femto Device to the base station in dependence upon the received identifier of the base station. In response to the Neighbor Discovery Request message received, a Neighbor Discovery Report message is transmitted from the base station to the Femto device. The Neighbor Discovery Report message includes a field indicating network addresses of a Session Reference Network Controller and an Access Gateway that connect to the base station. Finally, the Femto Device connects to the Session Reference Network Controller and the Access Gateway via the Femto device in dependence upon the network addresses of the Session Reference Network Controller and the Access Gateway.

18 Claims, 4 Drawing Sheets

IAS-Neighbor Discovery Report Message

| 7 | 6 | 5 | 4 | 3 | 2 | 1 | 0 | Octet |
|---|---|---|---|---|---|---|---|---|
| ⇒ Message Type = [11H] ||||||||  1 |
| ⇒ Correlation ID: IAS IEI = [02H] |||||||| 1 |
| Length = [04H] |||||||| 2 |
| (MSB) | Correlation Value = <any value> ||||||| 3 |
|  |||||||| 4 |
|  |||||||| 5 |
|  ||||||| (LSB) | 6 |
| ⇒ Network Identity (NW ID): IAS IEI = [03H] |||||||| 1 |
| Length = [variable] |||||||| 2 |
| *Sender NW ID: IF Network Identity Type = 01H (ANID) {1:* |||||||||
| Network Identity Type = [01H (ANID)] |||||||| 3 |
| (MSB) | ANID = <any value> ||||||| 4 |
|  | ... ||||||| ... |
|  ||||||| (LSB) | 19 |
| *} END Network Identity Type = 01H, End Network Identity* |||||||||
| *Receiver NW ID: IF Network Identity Type = 01H (ANID) {1:* |||||||||
| Network Identity Type = [01H (ANID)] |||||||| 20 |
| (MSB) | ANID = <any value> ||||||| 21 |
|  | ... ||||||| ... |
|  ||||||| (LSB) | 36 |
| *} END Network Identity Type = 01H, End Network Identity* |||||||||
| ⇒ Neighbor Discovery Information: IAS IEI = [0CH] |||||||| 1 |
| Length = [variable] |||||||| 2 |
| *Neighbor Network Identity Type = 01H (Neighboring ANID) {1+:* |||||||||
| Network Identity Type = [01H (ANID)] |||||||| 3 |
| (MSB) | ANID = <any value> ||||||| 4 |
|  | ... ||||||| ... |
|  ||||||| (LSB) | 19 |
| *} END Neighbor Network Identity Type = 01H* |||||||||

FIG. 3A

IAS-Neighbor Discovery Report Message

| 7 | 6 | 5 | 4 | 3 | 2 | 1 | 0 | Octet |
|---|---|---|---|---|---|---|---|---|
| | | ⇒ | Sector Parameters: IAS IEI = [0DH] | | | | | 1 |
| | | | Length = <any value> | | | | | 2 |
| (MSB) | | | Sector Parameters = <any value> | | | | | 3 |
| | | | | | | | | |
| | | ⇒ | Sector Parameters: IAS IEI = [0DH] | | | | | 1 |
| | | | Length = <any value> | | | | | 2 |
| (MSB) | | | Sector Parameters = <any value> | | | | | 3 |
| | | | ... | | | | | ... |
| | | | | | | | (LSB) | n |
| | ⇒ | UMB Network Connection Info: IAS IEI = [Assigned by 3GPP2] | | | | | | 1 |
| | | | Length = [variable] | | | | | 2 |
| | | | AGW Address Type =[01H (IPv4), 02H (IPv6)] | | | | | 3 |
| *IF AGW Address Type = 01H (IPv4) {1:* | | | | | | | | |
| (MSB) | | | AGW IP Address = <any value> | | | | | 4 |
| | | | ... | | | | | ... |
| | | | | | | | (LSB) | 7 |
| *} ELSEIF AGW Address Type = 02H (IPv6) {1:* | | | | | | | | |
| (MSB) | | | AGW IP Address = <any value> | | | | | 4 |
| | | | ... | | | | | ... |
| | | | | | | | (LSB) | 19 |
| *}* | | | | | | | | |
| | | | SRNC Address Type =[01H (IPv4), 02H (IPv6)] | | | | | k |
| *IF SRNC Address Type = 01H (IPv4) {1:* | | | | | | | | |
| (MSB) | | | SRNC IP Address = <any value> | | | | | k+1 |
| | | | ... | | | | | ... |
| | | | | | | | (LSB) | k+4 |
| *} ELSEIF SRNC Address Type = 02H (IPv6) {1:* | | | | | | | | |
| (MSB) | | | SRNC IP Address = <any value> | | | | | k+1 |
| | | | ... | | | | | ... |
| | | | | | | | (LSB) | k+15 |
| *}* | | | | | | | | |

FIG. 3B

IAS-BASED CONFIGURATION FOR UMB FEMTO DEVICES

CLAIM OF PRIORITY

This application makes reference to, incorporates the same herein, and claims all benefits accruing under 35 U.S.C. §119 from a provisional application earlier filed in the U.S. Patent & Trademark Office on 24 Aug. 2007 and there duly assigned Ser. No. 60/935,679.

BACKGROUND OF THE INVENTION

1. Field of the Invention

The present invention relates to a method and apparatus for configuring Ultra Mobile Broadband Femto Devices.

2. Description of the Related Art

Femto Devices are base stations that support a very small cell radius. Typically, the Femto Device will be deployed in a home environment which has poor coverage from the larger maro cell where the Femto Device resides. Femto Devices are expected to be widely deployed in the coming year.

In the third Generation Partnership Project 2 (3GPP2) Interoperability Specification (A.S0020), an Inter-Access Network Signaling (IAS) protocol is defined for networks that support Ultra Mobile Broadband technology (UMB). UMB requires all base stations (BSs) serving a particular Access Terminal (AT) to be interconnected via an IP network, because packets destined to or arriving from the AT may be sent from or received on any BS that the AT is connected to. One method by which BSs can discover their neighbor base stations is through the use of IAS-Neighbor Discovery Report messages, which the BSs send to each other to report Access Network IDs (ANIDs—essentially IP addresses) of neighboring BSs as well as other UMB-related information about neighboring cells. The IAS-Neighbor Discovery Report message as defined in A.S0020 includes only information about immediate neighbors of the BS that transmits the IAS-Neighbor Discovery Report message.

In UMB networks, serving BSs must also connect to a Session Reference Network Controller (SRNC) which hosts an Anchor Route for the UMB session. All BSs serving the AT must use the same SRNC. In addition, it is desirable that all BSs serving the AT be connected to the same Access Gateway (AGW).

In a typical UMB Femto Device deployment, the Femto Device and the BS that controls the macrocell that the Femto Device resides in will need to be able to communicate via the UMB network protocols. In addition, in order for the UMB air interface to work properly (e.g. allow for smooth handoffs between the Femto Device and the macrocell), the Femto Device should connect to the same SRNC and AGW that the macrocell BS is connected to.

Contemporarily, the IAS-Neighbor Discovery Report message only contain ANIDS and sector information of the immediate neighbors of the BS that transmits the IAS-Neighbor Discovery Report message. For a deployment of many Femto Devices over a large area (possibly serviced by many macro BSs), each Femto Device would need to be individually provisioned with the IP addresses of the SRNC and AGW used by the macrocell BS where the Femto Device resides. This makes for a very cumbersome Operations, Administration, and Maintenance (OA&M) process, whereby a central management system must first geographically locate the Femto Device when the Femto device is initialized, identify the most likely macrocell that the Femto Device resides in, identify the BS that controls that macrocell, and then identify the SRNC and AGW that host that BS. There exists a need in the art for a more dynamic signaling method by which the Femto Device can attain the SRNC and AGW connection information directly from the BS that is controlling the macrocell that the Femto Device is residing in.

SUMMARY OF THE INVENTION

It is therefore an object of the present invention to provide an improved method and apparatus for configuring UMB Femto Devices.

It is another object of the present invention to provide an improved method for UMB Femto Devices to obtain information of the Session Reference Network Controller (SRNC) and the Access Gateway.

According to one aspect of the present invention, a method for communication is provided. In this method, a Neighbor Discovery Report message is transmitted from a first base station to a second base station in an Ultra Mobile Broadband network system. The Neighbor Discovery Report message includes network addresses of an Access Gateway and a Session Reference Network Controller that connect to the first base station.

The second base station may be a Femto Device which controls a Femto Cell, and which is located in a macro cell controlled by the first base station.

The first base station and the Femto Device may communicate with each other via an Ultra Mobile Broadband network protocol.

In response to the Neighbor Discovery Report message received from the first base station, the second base station may connect to the Access Gateway and the Session Reference Network Controller in dependence upon the network addresses of the Access Gateway and the Session Reference Network Controller.

The step of transmitting the Neighbor Discovery Report message may be performed in response to a Neighbor Discovery Request message received from the second base station.

The Neighbor Discovery Report message may include information regarding neighboring base stations of the first base station.

The Neighbor Discovery Report message may include an Ultra Mobile Broadband Connection Information element carrying the network addresses of the Access Gateway and the Session Reference Network Controller that the first base station is connected to. The Ultra Mobile Broadband Connection Information element may include an Information Element Identity field, a Length field, an Access Gateway Address Type field, an Access Gateway Address field, a Session Reference Network Controller Address Type field, and a Session Reference Network Controller Address field. The Information Element may contain multiple instances of this information.

According to another aspect of the present invention, a method for configuring Femto Devices is provided. In this method, a Femto pilot signal is transmitted from a Femto device to an Access Terminal, which is served by a plurality of base stations in the Ultra Mobile Broadband network system. The plurality of base stations connect to a Session Reference Network Controller and an Access Gateway, and each base station covers and controls a macrocell where a plurality of Femto devices are located. Then, an identifier of a base station that controls a macrocell where the Femto Device is located is transmitted from the Access Terminal to the Femto Device. Next, a Neighbor Discovery Request message is transmitted from the Femto Device to the base station in dependence upon the received identifier of the base station. In response to the Neighbor Discovery Request message received, a Neighbor Discovery Report message is transmitted from the base station to the Femto device. The Neighbor Discovery Report message includes a field indicating network addresses of the Session Reference Network Controller and the Access Gateway that connect to the base station. Finally, the Femto Device connects to the Session Reference Network Controller and the Access Gateway via the Femto device in dependence upon the network addresses of the Session Reference Network Controller and the Access Gateway.

According to still another aspect of the present invention, a base station in an Ultra Mobile Broadband network system is provided. The base station transmits a Neighbor Discovery Report message. The Neighbor Discovery Report message includes network addresses of an Access Gateway(s) and a Session Reference Network Controller(s) that connect to the base station.

According to a further aspect of the present invention, a Femto Device in an Ultra Mobile Broadband network system is provided. The Femto Device transmits a Neighbor Discovery Request message to a base station which controls a macro cell where the Femto Device is located. The Femto Device then receives a Neighbor Discovery Report message from the base station. The Neighbor Discovery Report message includes a field indicating network addresses of a Session Reference Network Controller and an Access Gateway that connect to the base station. Subsequently, the Femto Device to the Session Reference Network Controller and the Access Gateway in dependence upon the network addresses of the Session Reference Network Controller and the Access Gateway.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 3A and 3B schematically illustrate the format of the enhanced Inter-Access Network Signaling Neighbor Discovery Report message as an embodiment according to the principles of the present invention.

DETAILED DESCRIPTION OF THE INVENTION

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings.

This application incorporates by reference the third Generation Partnership Project 2 (3GPP2) Interoperability Specification (A.S0020).

Figure 1:
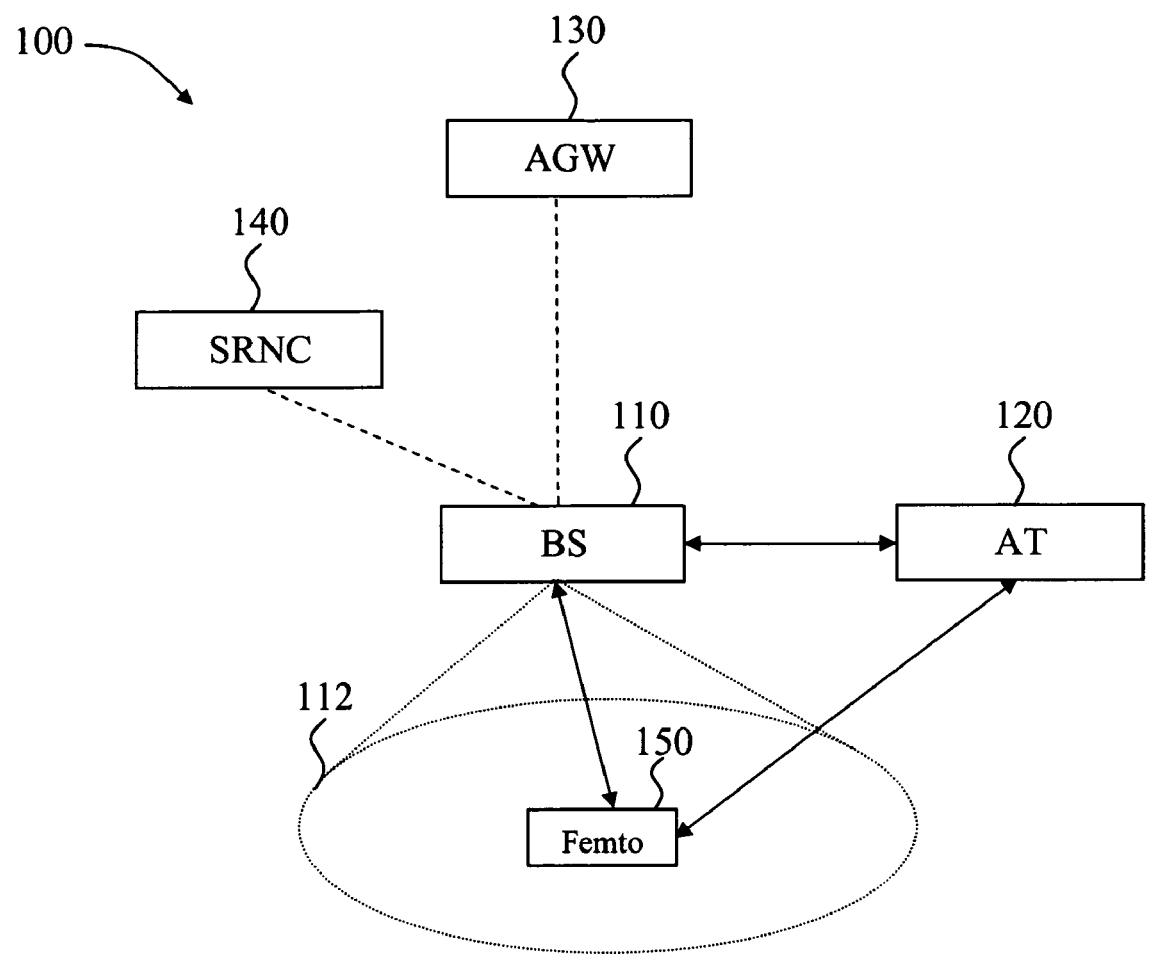
FIG. 1 schematically illustrates an Ultra Mobile Broadband (UMB) Radio Access Network (RAN) deploying a Femto device according to one embodiment of the principles of the present invention.

FIG. 1 schematically illustrates an Ultra Mobile Broadband (UMB) Radio Access Network (RAN) deploying a Femto device. UMB network 100 includes an access terminals (AT) 120 which originates a UMB session. AT 120 is served by a plurality of base stations (BSs) 110 interconnected with each other via an IP network. The base stations discover their neighboring base stations by transmitting to each other an Inter-Access Network Signaling (IAS)-Neighbor Discovery Report message to report Access Network IDs (ANIDs—essentially IP addresses) of neighboring BSs as well as other UMB-related information about neighboring cells. UMB network 100 also includes an Access Gateway (AGW) 130 and a Session Reference Network Controller (SRNC) 140. Access Gateway (AGW) 130 provides the point of Internet Protocol (IP) attachment to a Packet Data Network associated with Ultra Mobile Broadband (UMB) Radio Access Network (RAN) 100. Session Reference Network Controller (SRNC) 140 hosts an Anchor Route for the UMB session. All BSs serving the AT must use the same SRNC. In addition, it is desirable that all BSs serving the AT be connected to the same Access Gateway (AGW).

Femto devices are BSs that support a very small cell radius; typically, these Femto Devices will be deployed in a home environment which has poor coverage from the larger macro cell that is controlled by a BS. As shown in FIG. 1, Femto device 150 is disposed in macrocell 112 that is controlled by BS 110.

In a typical UMB Femto Device deployment, the Femto Device and the BS that controls the macrocell that the Femto Device resides in will need to be able to communicate via the UMB network protocols. In addition, in order for the UMB air interface to work properly (e.g. allow for smooth handoffs between the Femto Device and the macrocell), the Femto Device should connect to the same SRNC and AGW that the macrocell BS is connected to.

Contemporarily, the IAS-Neighbor Discovery Report message only contain ANIDS and sector information of the immediate neighbors of the BS that transmits the IAS-Neighbor Discovery Report message. For a deployment of many Femto Devices over a large area (possibly serviced by many macro BSs), each Femto Device would need to be individually provisioned with the IP addresses of the SRNC and AGW used by the BS that controls the macrocell where the Femto Device resides. This makes for a very cumbersome Operations, Administration, and Maintenance (OA&M) process, whereby a central management system must first geographically locate the Femto Device when the Femto device is initialized, identify the most likely macrocell that the Femto Device resides in, identify the BS that controls that macrocell, and then identify the SRNC and AGW that host that BS. The exists a need in the art for a more dynamic signaling method by which the Femto Device can attain the SRNC and AGW connection information directly from the BS that is controlling the macrocell that the Femto Device is residing in.

The invention adds fields to the IAS-Neighbor Discovery Report message that will indicate the IP addresses of the SRNC and AGW that the sending entity, i.e., the BS uses. Using this enhanced message, the Femto Device can quickly learn the correct SRNC and AGW to use so as to ensure proper UMB functionality. The IAS-Neighbor Discovery Report message is triggered from the user's mobile station when the Femto Device is first configured.

Figure 2:
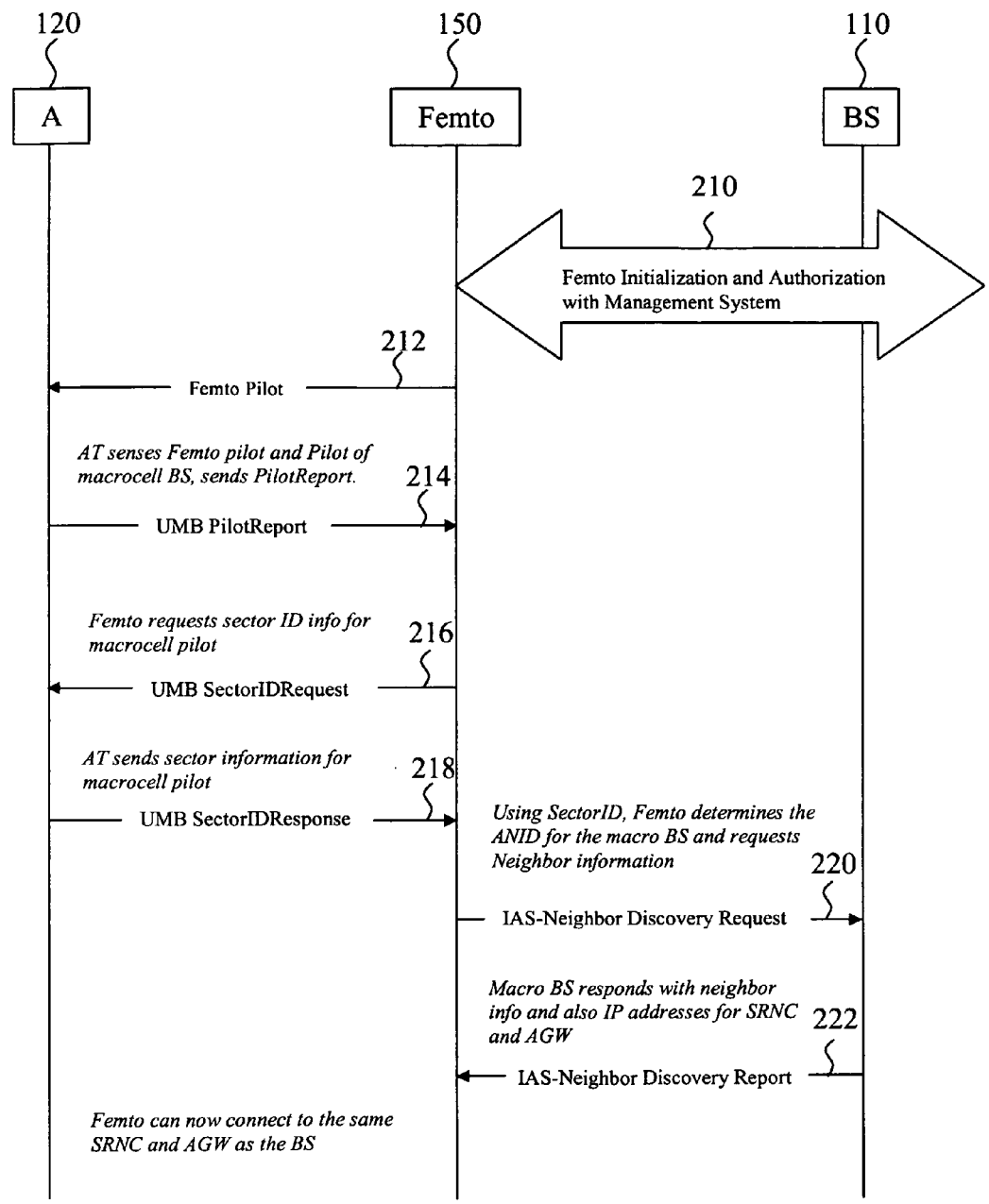
FIG. 2 schematically illustrates a configuration process for a Femto device as one embodiment according to the principles of the present invention.

FIG. 2 schematically illustrates a configuration process for a Femto device as one embodiment according to the principles of the present invention. First, at step 210, a Femto initialization and Authorization procession is performed in a Management system (not shown) for Femto device 150. At step 212, Femto device 150 transmits a Femto Pilot message to AT 120. At step 214, AT 120 senses the Femto pilot message transmitted from Femto device 150. In response to the Femto pilot message, AT 120 transmits a UMB Pilot Report message. Note that BS 110 that controls macrocell 112 where Femto device 150 resides also transmits a macrocell Pilot message to AT 120 at step 212. Therefore, the UMB Pilot Report message includes the pilot information of BS 110 that controls macrocell 112. Femto device 150 will use this information to identify which base station to contact later. Femto device 150 then requests information regarding a sector Identity (ID) for the macrocell Pilot message by transmitting a UMB Sector ID Request message to AT 120 at step 216. In response to the UMB Sector ID Request message, AT 120 transmits a UMB Sector ID Response message carrying the sector information, i.e., sector ID, for the macrocell Pilot message at step 218. Subsequently, using the sector ID, Femto device 150 determines the Access Network ID for BS 110 that controls macrocell 112 where Femto device 150 resides, and requests neighbor information of BS 110 by transmitting a IAS-Neighbor Discovery Request message at step 220. At step 222, BS 110 responds to the IAS-Neighbor Discovery Request message by transmitting a IAS-Neighbor Discovery Report message containing the neighbor information of BBS 110, and transmitting IP addresses of AGW 130 and SRNC 140 that BS 110 is connected to. Finally, Femto device 150 can connect to AGW 130 and SRNC 140 based on the IP addresses of AGW 130 and SRNC 140. In this way, the Femto device can connect to the same SRNC and AGW that the BS is connected to.

FIGS. 3A and 3B schematically illustrate the format of the enhanced IAS-Neighbor Discovery Report message as an embodiment according to the principles of the present invention. The enhanced IAS-Neighbor Discovery Report message contains several information elements (IEs), such as message type, Correlation Identity (ID), Network ID, Neighbor Discovery Information, Sector Parameters, and UMB Network Connection information. The message may include multiple instances of these information elements.

The Message Type Information Element (IE) is used to indicate the type of the message and occupies one octet (i.e., byte) in the IAS-Neighbor Discovery Report message. According to the 3GPP2 A.S0020, a hexadecimal value of "11" for the Message Type IE indicates that the message is an IAS-Neighbor Discovery Report message.

The Correlation ID IE contains an ID that allows an entity to correlate a request-response pair and occupies six octets in the IAS-Neighbor Discovery Report message. The first octet of the Correlation ID IE is allocated to an Inter-Access Network Signaling (IAS) Information Element Identifier (IEI). A hexadecimal value of "02" is used to indicate that the current Information Element (IE) is the Correlation ID. The second octet of the Correlation ID IE is allocated to a length field, which indicates the number of octets following the length field in the current IE. Here, a hexadecimal value of "04" indicates that four octets are following the length field in the Correlation ID IE. The third to sixth octets of the Correlation ID IE are allocated to a correlation value, which is a manufacturer concern.

The Network Identity IE contains the network identities of the sending and receiving Access Network Route Instances (ANRIs), i.e., the base stations, and occupies thirty-six octets. The first octet is allocated to the IAS IEI, which is a hexadecimal value of "03". The second octet is allocated to the length field. The third through nineteenth octets are allocated to indicate the Network ID of the sender, in which the third octet is allocated to indicate the Network Identity Type of the sender. When the Network Identity Type of the sender is set to a hexadecimal value of "01", the fourth through nineteenth octets are coded with the values of the Access network Identifier of the sender. The twentieth through thirty-sixth octets are allocated to indicate the network ID of the receiver, in which the twentieth octet is allocated to indicate the Network Identity Type of the receiver. When the Network Identity Type of the receiver is set to a hexadecimal value of "01", the twenty-first through thirty-sixth octets are coded with the values of the Access network Identifier of the receiver.

The Neighbor Discovery Information IE contains the information that the receiving ANRI needs to communicate with the sending ANRI, and to configure the air interface signaling information, such as neighbor fields Sector Parameters. The Neighbor Discovery Information IE occupies nineteen octets. The first octet is allocated to the IAS IEI, which is a hexadecimal value of "0C". The second octet is allocated to the length field. The third through nineteenth octets are allocated to indicate the Neighbor Network Identity Type. When the Neighbor Network Identity Type is set to a hexadecimal value of "01", the fourth through nineteenth octets are coded with the values of the Access network Identifier of the neighbor.

The Sector parameters IE contains the encapsulated air interface Sector Parameter message, and occupies at least three octets. The first octet is allocated to the IAS IEI, which is a hexadecimal value of "0D". The second octet is allocated to the length field. The rest octets are allocated to the Sector Parameter message.

The UMB Network Connection Information IE contains network addresses of the AGW and the SRNC of the sending BS, and occupies seven or nineteen octets. The first octet is allocated to the IAS IEI of the UMB Network Connection Information IE. The second octet is allocated to the length field. In order to indicate the address of the AGW, the third octet is allocated to the AGW Address Type. When the AGW Address Type is set to a hexadecimal value of "01" to indicate Internet Protocol Version Four, the fourth through seventh octets are coded to indicate the AGW IPv4 address. When the AGW Address Type is set to a hexadecimal value of "02" to indicate Internet Protocol Version Six, the fourth through nineteenth octets are coded to indicate the AGW IPv6 address. Alternatively, in order to indicate the address of the SRNC, the k-th octet is allocated to the SRNC Address Type. When the SRNC Address Type is set to a hexadecimal value of "01" to indicate Internet Protocol Version Four, the k+1-th through k+4-th octets are coded to indicate the SRNC IPv4 address. When the AGW Address Type is set to a hexadecimal value of "02" to indicate Internet Protocol Version Six, the k+1-th through k+15-th octets are coded to indicate the SRNC IPv6 address.

Accordingly, in the present invention, the central management system does not need to know the geographical location of the Femto device. It is advantageous for the Femto device and the macrocell BS to connect to the same SRNC and AGW, and the present invention provides a direct signaling method between the Femto device and the macrocell BS to share the geographical information of the Femto device. Note that this does not preclude the Femto device from sending information regarding the macrocell BS to the central management system for other purposes.

While the present invention has been described with reference to exemplary embodiments thereof, it will be understood by those skilled in the art that various changes in form and detail may be made therein without departing from the scope of the present invention as defined by the following claims. In addition to the IP addresses of the AGW and the SRNC, other network information may also be added to the IAS-Neighbor Discovery Report message.

What is claimed is:

1. A method for communication, the method comprising: transmitting, by a first base station in an Ultra Mobile Broadband network system, a Neighbor Discovery Report message to a second base station, the Neighbor Discovery Report message comprising network addresses of an Access Gateway and a Session Reference Network Controller that connect to the first base station.

2. The method of claim 1, the second base station being a Femto Device which controls a Femto Cell and which is located in a macro cell controlled by the first base station.

3. The method of claim 2, the first base station and the Femto Device communicating with each other via an Ultra Mobile Broadband network protocol.

4. The method of claim 1, further comprising: in response to the Neighbor Discovery Report message received from the first base station, connecting, via the second base station, to said Access Gateway and said Session Reference Network Controller in dependence upon said network addresses of the Access Gateway and the Session Reference Network Controller.

5. The method of claim 1, further comprising: transmitting the Neighbor Discovery Report message being in response to a Neighbor Discovery Request message received from the second base station.

6. The method of claim 1, the Neighbor Discovery Report message comprising information regarding neighboring base stations of the first base station.

7. The method of claim 1, the Neighbor Discovery Report message comprising an Ultra Mobile Broadband Connection Information element comprising the network addresses of the Access Gateway and the Session Reference Network Controller that the first base station is connected to, the Ultra Mobile Broadband Connection Information element comprising:
an Information Element Identity field;
a Length field;
an Access Gateway Address Type field;
an Access Gateway Address field;
a Session Reference Network Controller Address Type field; and
a Session Reference Network Controller Address field.

8. A method for configuring Femto Devices, the method comprising:
transmitting a Femto pilot signal via a Femto device in an Ultra Mobile Broadband network system to an Access Terminal, the Access Terminal being served by a plurality of base stations in the Ultra Mobile Broadband network system, the plurality of base stations connecting to a Session Reference Network Controller and an Access Gateway, and each base station covering and controlling a macrocell where a plurality of Femto devices are located;
transmitting, via the Access Terminal, an identifier of a base station that controls a macrocell where the Femto Device is located;
transmitting, via the Femto device, a Neighbor Discovery Request message to said base station in dependence upon the received identifier of the base station;
in response to the Neighbor Discovery Request message received, transmitting, via said base station, a Neighbor Discovery Report message to the Femto device, the Neighbor Discovery Report message comprising a field indicating network addresses of said Session Reference Network Controller and said Access Gateway that connect to said base station; and
connecting to said Session Reference Network Controller and said Access Gateway via the Femto device in dependence upon the network addresses of the Session Reference Network Controller and the Access Gateway.

9. A base station in a communication system, the base station configured to transmit a Neighbor Discovery Report message in an Ultra Mobile Broadband network system, the Neighbor Discovery Report message comprising network addresses of an Access Gateway and a Session Reference Network Controller that connect to the base station.

10. The base station of claim 9, the base station configured to transmit said Neighbor Discovery Report message to a Femto Device which controls a Femto Cell and which is located in a macro cell controlled by the base station.

11. The base station of claim 10, the base station configured to communicate with the Femto Device via an Ultra Mobile Broadband network protocol.

12. The base station of claim 9, the base station configured to transmit the Neighbor Discovery Report message in response to a Neighbor Discovery Request message.

13. The base station of claim 9, the Neighbor Discovery Report message comprising information regarding neighboring base stations of the base station.

14. The base station of claim 9, the Neighbor Discovery Report message comprising an Ultra Mobile Broadband Connection Information element comprising the network addresses of the Access Gateway and the Session Reference Network Controller that the first base station is connected to, the Ultra Mobile Broadband Connection Information element comprising:
an Information Element Identity field;
a Length field;
an Access Gateway Address Type field;
an Access Gateway Address field;
a Session Reference Network Controller Address Type field; and
a Session Reference Network Controller Address field.

15. A Femto Device, the Femto Device configured to:
transmit a Neighbor Discovery Request message to a base station in an Ultra Mobile Broadband network system, the base station controlling a macro cell where the Femto Device is located;
receive a Neighbor Discovery Report message from the base station, the Neighbor Discovery Report message comprising a field indicating network addresses of a Session Reference Network Controller and an Access Gateway that connect to the base station; and
connect to the Session Reference Network Controller and the Access Gateway in dependence upon the network addresses of the Session Reference Network Controller and the Access Gateway.

16. The Femto Device of claim 15, the Femto Device configured to communicate with the base station via an Ultra Mobile Broadband network protocol.

17. The Femto Device of claim 15, the Neighbor Discovery Report message comprising information regarding neighboring base stations of the base station.

18. The Femto Device of claim 15, the Neighbor Discovery Report message comprising an Ultra Mobile Broadband Connection Information element comprising the network addresses of the Access Gateway and the Session Reference Network Controller that the first base station is connected to, the Ultra Mobile Broadband Connection Information element comprising:
  an Information Element Identity field;
  a Length field;
  an Access Gateway Address Type field;
  an Access Gateway Address field;
  a Session Reference Network Controller Address Type field; and
  a Session Reference Network Controller Address field.

* * * * *